US008818985B2

(12) United States Patent
Fischer et al.

(10) Patent No.: US 8,818,985 B2
(45) Date of Patent: Aug. 26, 2014

(54) RULE-BASED PRIORITIZATION OF SOCIAL DATA

(75) Inventors: Ronald F. Fischer, San Francisco, CA (US); Steve Slater, Alamo, CA (US)

(73) Assignee: salesforce.com, inc., San Francisco, CA (US)

(*) Notice: Subject to any disclaimer, the term of this patent is extended or adjusted under 35 U.S.C. 154(b) by 251 days.

(21) Appl. No.: 13/112,805

(22) Filed: May 20, 2011

(65) Prior Publication Data

US 2011/0314029 A1 Dec. 22, 2011

Related U.S. Application Data

(60) Provisional application No. 61/321,479, filed on Apr. 6, 2010, provisional application No. 61/346,839, filed on May 20, 2010, provisional application No. 61/354,638, filed on Jun. 14, 2010.

(51) Int. Cl.
*G06F 17/30* (2006.01)

(52) U.S. Cl.
USPC .................. 707/707; 707/732; 707/733

(58) Field of Classification Search
USPC .......... 707/748, 707, 732, 737–738, 751, 733
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |

(Continued)

OTHER PUBLICATIONS

U.S. Office Action dated Dec. 24, 2012 issued in U.S. Appl. No. 13/155,656.

(Continued)

*Primary Examiner* — Vincent F Boccio
(74) *Attorney, Agent, or Firm* — Weaver Austin Villeneuve & Sampson LLP

(57) ABSTRACT

A method of prioritizing feed items based on rules is provided. User input establishes one or more rules to prioritize a feed item, wherein at least one of the one or more rules incorporates the input data. Such user input may include user-created data or feed metrics. The one or more rules may be weighted. Additional user input configures one or more message cues. A plurality of feed items are prioritized based on the one or more rules. The plurality of feed items are associated with a plurality of feeds, wherein each feed is associated with an object stored in a database system. The plurality of feed items are then displayed in combination with the one or more message cues to a plurality of users of the database system.

20 Claims, 3 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,620,697 B1 | 11/2009 | Davies |
| 7,644,122 B2 | 1/2010 | Weyer et al. |
| 7,668,861 B2 | 2/2010 | Steven |
| 7,669,123 B2 | 2/2010 | Zuckerberg et al. |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,881,983 B2 | 2/2011 | Pitkow |
| 7,933,884 B2 | 4/2011 | Menezes et al. |
| 7,945,653 B2 | 5/2011 | Zuckerberg et al. |
| 8,005,896 B2 | 8/2011 | Cheah |
| 8,015,495 B2 | 9/2011 | Achacoso et al. |
| 8,060,634 B1 | 11/2011 | Darnell et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,335,763 B2 | 12/2012 | Narayanan et al. |
| 8,352,499 B2 | 1/2013 | Bharat et al. |
| 8,380,803 B1 | 2/2013 | Stibel et al. |
| 8,457,545 B2 | 6/2013 | Chan |
| 8,484,111 B2 | 7/2013 | Frankland et al. |
| 8,533,719 B2 | 9/2013 | Fedorova et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0267973 A1 | 12/2005 | Carlson et al. |
| 2007/0061266 A1* | 3/2007 | Moore et al. .................... 705/51 |
| 2007/0208687 A1* | 9/2007 | O'Conor et al. .................. 707/1 |
| 2007/0214097 A1 | 9/2007 | Parsons et al. |
| 2008/0040673 A1 | 2/2008 | Zuckerberg et al. |
| 2008/0249972 A1 | 10/2008 | Dillon |
| 2008/0275884 A1 | 11/2008 | Yoshida et al. |
| 2009/0049053 A1 | 2/2009 | Barker et al. |
| 2009/0063415 A1 | 3/2009 | Chatfield et al. |
| 2009/0160658 A1* | 6/2009 | Armstrong et al. ............... 707/3 |
| 2009/0172773 A1 | 7/2009 | Moore |
| 2009/0177484 A1 | 7/2009 | Davis et al. |

(56) References Cited

U.S. PATENT DOCUMENTS

| | | |
|---|---|---|
| 2009/0192965 A1 | 7/2009 | Kass et al. |
| 2009/0222750 A1 | 9/2009 | Jain et al. |
| 2009/0282002 A1 | 11/2009 | Reeder et al. |
| 2010/0057682 A1 | 3/2010 | Ramsay et al. |
| 2010/0083124 A1 | 4/2010 | Druzgalski et al. |
| 2010/0144318 A1 | 6/2010 | Cable |
| 2010/0146054 A1 | 6/2010 | Armstrong et al. |
| 2010/0159995 A1* | 6/2010 | Stallings et al. ............. 455/566 |
| 2010/0169159 A1 | 7/2010 | Rose et al. |
| 2010/0268830 A1 | 10/2010 | McKee et al. |
| 2010/0325107 A1 | 12/2010 | Kenton et al. |
| 2011/0004831 A1 | 1/2011 | Steinberg et al. |
| 2011/0087534 A1 | 4/2011 | Strebinger et al. |
| 2011/0145881 A1* | 6/2011 | Hartman et al. ............. 725/118 |
| 2011/0153595 A1 | 6/2011 | Bernstein et al. |
| 2011/0153646 A1 | 6/2011 | Hong et al. |
| 2011/0161444 A1 | 6/2011 | Chauhan |
| 2011/0173283 A1 | 7/2011 | Puthenkulam et al. |
| 2011/0173570 A1 | 7/2011 | Moromisato et al. |
| 2011/0179020 A1 | 7/2011 | Ozzie et al. |
| 2011/0179378 A1 | 7/2011 | Wheeler et al. |
| 2011/0225146 A1 | 9/2011 | Boswell |
| 2011/0246910 A1 | 10/2011 | Moxley et al. |
| 2011/0258561 A1 | 10/2011 | Ladouceur et al. |
| 2011/0264656 A1 | 10/2011 | Dumais et al. |
| 2011/0282941 A1 | 11/2011 | Chan et al. |
| 2011/0289097 A1 | 11/2011 | Fischer |
| 2012/0001919 A1 | 1/2012 | Lumer |
| 2012/0036200 A1 | 2/2012 | Cole et al. |
| 2012/0059795 A1 | 3/2012 | Hersh et al. |
| 2012/0102420 A1 | 4/2012 | Fukahori |
| 2012/0158714 A1 | 6/2012 | Dumant |
| 2012/0191779 A1 | 7/2012 | Mandel et al. |
| 2012/0203831 A1 | 8/2012 | Schoen et al. |
| 2012/0223951 A1 | 9/2012 | Dunn et al. |
| 2012/0290407 A1 | 11/2012 | Hubbard et al. |
| 2012/0331053 A1 | 12/2012 | Dunn |
| 2013/0018955 A1 | 1/2013 | Thaxton et al. |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0060859 A1 | 3/2013 | Olsen et al. |
| 2013/0061156 A1 | 3/2013 | Olsen et al. |

OTHER PUBLICATIONS

U.S. Office Action dated Mar. 27, 2013 issued in U.S. Appl. No. 13/111,183.

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Aug. 15, 2013 issued in U.S. Appl. No. 13/155,656.

U.S. Office Action (Advisory Action) dated Nov. 1, 2013 issued in U.S. Appl. No. 13/155,656.

U.S. Office Action dated Jan. 31, 2014 issued in U.S. Appl. No. 13/155,656.

U.S. Office Action dated Oct. 28, 2013 issued in U.S. Appl. No. 13/280,086.

U.S. Office Action dated Aug. 30, 2013 issued in U.S. Appl. No. 13/363,081.

U.S. Final Office Action dated Jan. 15, 2014 issued in U.S. Appl. No. 13/363,081.

U.S. Office Action dated Sep. 23, 2013 issued in U.S. Appl. No. 13/447,643.

U.S. Final Office Action dated Jan. 10, 2014 issued in U.S. Appl. 13/447,643.

U.S. Notice of Allowance dated Nov. 12, 2013 issued in U.S. Appl. No. 13/111,183.

U.S. Notice of Allowance dated Jan. 2, 2014 issued in U.S. Appl. 13/111,183.

Chong, Frederick; Carraro, Gianpaolo; and Wolter, Roger; "Multi-Tenant Data Architecture," *Microsoft Developer Network*[database online], [retrieved on Sep. 5, 2013]. Retrieved from the Internet URL: msdn.microsoft.com/en-us/library/aa479086.aspx#mlttntda__topic6, 25 pp.

\* cited by examiner

RULE-BASED PRIORITIZATION OF SOCIAL DATA

CROSS REFERENCE TO RELATED APPLICATIONS

The present application claims benefit under 35 USC §119 (e) of U.S. Provisional Applications No. 61/321,479, entitled "METHOD AND SYSTEM FOR PERFORMING A SEARCH IN FEED OF AN ON-DEMAND ENTERPRISE SERVICES ENVIRONMENT," filed on Apr. 6, 2010, by Peter Lee et al., the content of which is incorporated herein by reference in their entirety; No. 61/346,839, entitled "METRICS BASED ACCESSING OF SOCIAL THREADS AND RULE BASED PRIORITIZATION OF SOCIAL DATA," filed on May 20, 2010, by Ronald F. Fischer, the content of which is incorporated herein by reference in their entirety; and No. 61/354,638 entitled "METHODS AND SYSTEMS FOR PROVIDING A SECURE ONLINE FEED IN A MULTI-TENANT DATABASE ENVIRONMENT," filed on Jun. 14, 2010, by Steve Slater, the content of which is incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems, and more particularly to proactively prioritizing social data based on persistent rules and to ranking elements in a feed in an on-demand enterprise services environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

The present invention provides systems, apparatus, and methods for social data analysis and for ranking elements of a feed, and more particularly to proactively prioritizing social data based on persistent rules.

A method of prioritizing feed items based on rules is provided. User input establishes one or more rules to prioritize a feed item, wherein at least one of the one or more rules incorporates the input data. The one or more rules may be weighted. Additional user input configures one or more message cues. A plurality of feed items are prioritized based on the one or more rules. The plurality of feed items are associated with a plurality of feeds, wherein each feed is associated with an object stored in a database system. The plurality of feed items are then displayed in combination with the one or more message cues to a plurality of users of the database system.

While the present invention is described with reference to an embodiment in which techniques for performing searches of feeds in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this disclosure may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the disclosure, the embodiments of the invention do not necessarily address any of these deficiencies. In other words, different embodiments of the invention may address different deficiencies that may be discussed in the disclosure. Some embodiments may only partially address some deficiencies or just one deficiency that may be discussed in the disclosure, and some embodiments may not address any of these deficiencies.

Reference to the remaining portions of the disclosure, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

In the following drawings like reference numbers are used to refer to like elements. Although the following figures depict various examples of the invention, the invention is not limited to the examples depicted in the figures.

DEFINITIONS

Figure 1:
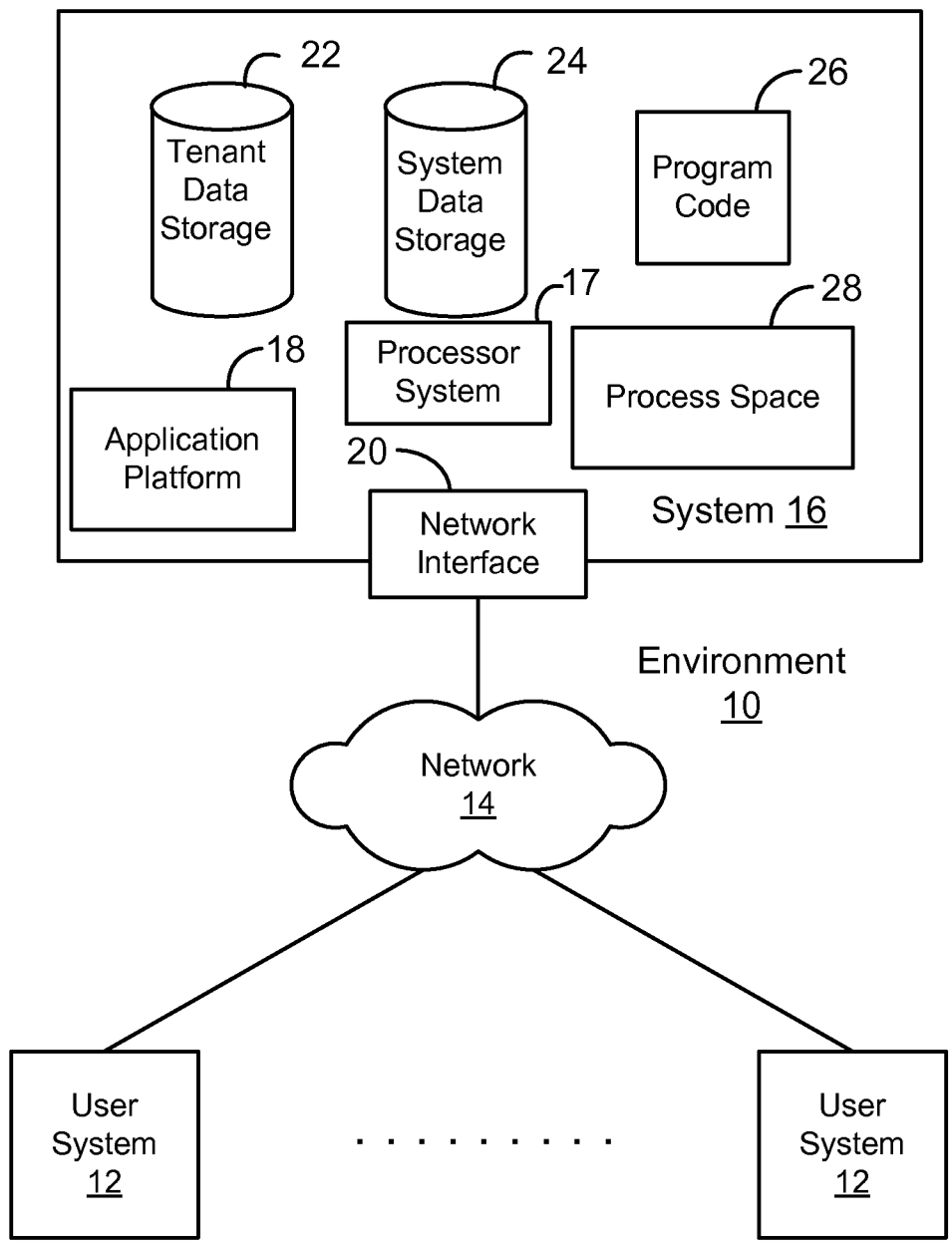
FIG. 1 illustrates a block diagram of an environment wherein an on-demand database service might be used.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As used herein, the term "query plan" refers to a set of steps used to access information in a database system.

As used herein, the term "user's profile" includes data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company that is a tenant of the database system that provides a database service.

As used herein, the term "record" refers to an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one embodiment implementing a multi-tenant database, all of the records for the tenants have an identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

As used herein, the term "feed" includes a combination (e.g., a list) of feed items. As user herein, the term "feed item" (or feed element) refers to information about a user ("profile feed") of the database or about a record ("record feed") in the database. A user following the user or record can receive the associated feed items. The feed items from all of the followed users and records can be combined into a single feed for the user.

As examples, a "feed item" can be a message and story (also called a feed tracked change). A feed can be a combination of messages and stories. Messages include text created by a user, and may include other data as well. Examples of messages include posts, status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order. In contrast to a post, a status update changes a status of a user and is made by that user. Other similar sections of a user's profile can also include an "About" section. A record can also have a status, whose update can be restricted to the owner of the record. The owner can be a single user, multiple users, or a group. In one embodiment, there is only one status for a record. In one embodiment, a comment can be made on any feed item. In another embodiment, comments are organized as a list explicitly tied to a particular story, post, or status update. In this embodiment, comments may not be listed in the first layer (in a hierarchal sense) of feed items, but listed as a second layer branching from a particular first layer feed item.

A "story" is data representing an event, and can include text generated by the database system in response to the event. In one embodiment, the data can initially be stored, and then the database system can later use the data to create text for describing the event. Both the data and/or the text can be a story, as used herein. In various embodiments, an event can be an update of a record and/or can be triggered by a specific action by a user. Which actions trigger an event can be configurable. Which events have stories created and which stories are sent to which users can also be configurable. Messages and stories can be stored as a field or child object of the record. For example, the feed can be stored as a child object of the record.

As used herein, a "group" is a collection of users. In some aspects, the group may be defined as users with a same or similar attribute, or by membership. In one embodiment, a "group feed" includes any feed item about any user in a group. In another embodiment, a "group feed" includes feed items that are about the group as a whole. In one implementation, the feed items for a group are only posts and comments.

As used herein, an "entity feed" or "record feed" refers to a feed of feed items about a particular record in the database, such as stories about changes to the record and posts made by users about the record. An entity feed can be composed of any type of feed item. Such a feed can be displayed on a page (e.g., a web page) associated with the record (e.g., a home page of the record). As used herein, a "profile feed" is a feed of feed items about a particular user. In one embodiment, the feed items for a profile feed are posts and comments that other users make about or send to the particular user, and status updates made by the user. Such a profile feed can be displayed on a page associated with the particular user. In another embodiment, feed items in a profile feed could include posts made by the particular user and feed tracked changes (stories) initiated based on actions of the particular user.

DETAILED DESCRIPTION

The present invention provides systems and methods for social data analysis and ranking elements in a feed, and more particularly for proactively prioritizing social data based on persistent rules. The various embodiments are particularly useful in an on-demand multi-tenant database and/or application service.

General Overview

Systems, apparatus, and methods are provided for implementing enterprise level social and business information networking. Such embodiments can provide more efficient use of a database system. For instance, a user of a database system may not easily know when important information in the database has changed, e.g., about a project or client. Embodiments can provide stories about such changes and other events, thereby keeping users informed.

By way of example, a user can update a record (e.g., an opportunity such as a possible sale of 1000 computers). Once the update has been made, a story about the update can then automatically be sent (e.g., in a feed) to anyone subscribing to the opportunity or to the user. Thus, the user does not need to contact a manager regarding the change in the opportunity, since the story about the update is sent via a feed right to the manager's feed page (or other page).

Next, mechanisms and methods for providing systems and methods for implementing enterprise level social and business information networking will be described with reference to example embodiments. First, an overview of an example database system is described, and then example embodiments regarding display of feeds are also described.

System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that embodiments might be use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
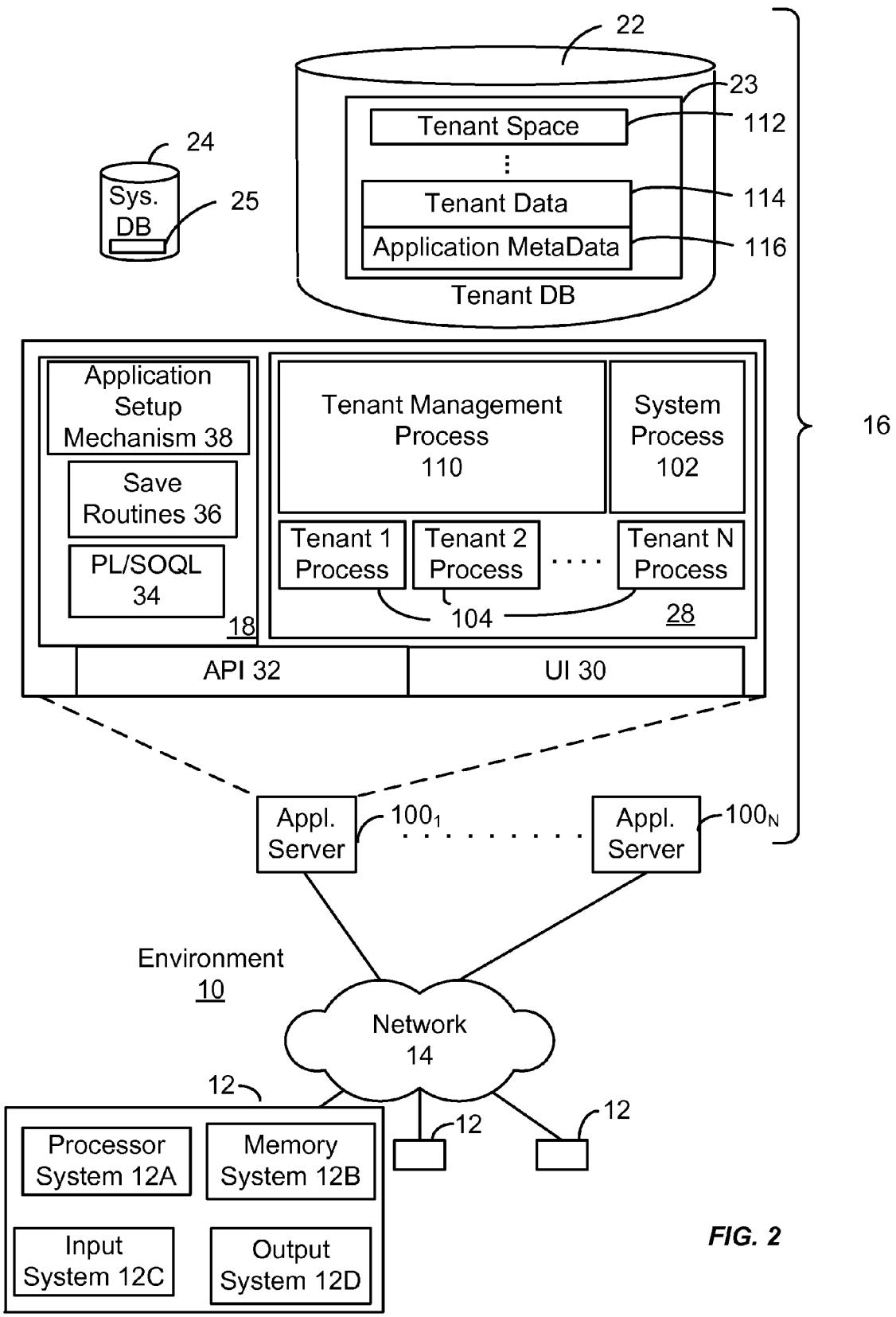
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present embodiments. It should be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing predefined fields. It should be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "Custom Entities and Fields in a Multi-Tenant Database System", by Craig Weissman, filed Apr. 2, 2004, which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Rule-Based Prioritization of Social Data

Traditional social data prioritization typically involves sorting messages in a feed based upon the date that the feed was either created or last commented upon. At times, too many feed elements may populate a user's feed viewer, e.g., resulting from following many records, peoples, and entities. A user may not be able to track all of them, and thus a user can tend to miss the items that are most important to the user or to the business of the tenant, which can be problematic. In some instances, a filter based upon user, group, channel, subject, or keyword can be specified on the current results to reduce and focus the set of visible messages. What has not been demonstrated is a system for proactively prioritizing such messages and other social data based upon persistent rules.

Rule-based systems have been used in other areas to sort or discard messages (for instance, routing systems or email systems). Social data presents a challenge different from existing systems because the messages tend to be individually small, large in number, diverse in content, and ephemeral. In order to account for these differences, a novel system for prioritizing, annotating, and demarcating this data is desirable. Such a system is ideally able to analyze the data based upon a set of established rules, quickly operate on the data to properly organize it, and display the data appropriately.

According to one embodiment, three components of a such a rule-based prioritization system include:

1. Rule Criteria: a rule specification format and a method for creation of rules;

2. Message Cues: a method for defining and assigning visual and auditory cues based on the rules; and 3. Rules Engine: an engine for applying the rules, creating the cues, and displaying the social data in near real time.

Figure 3:
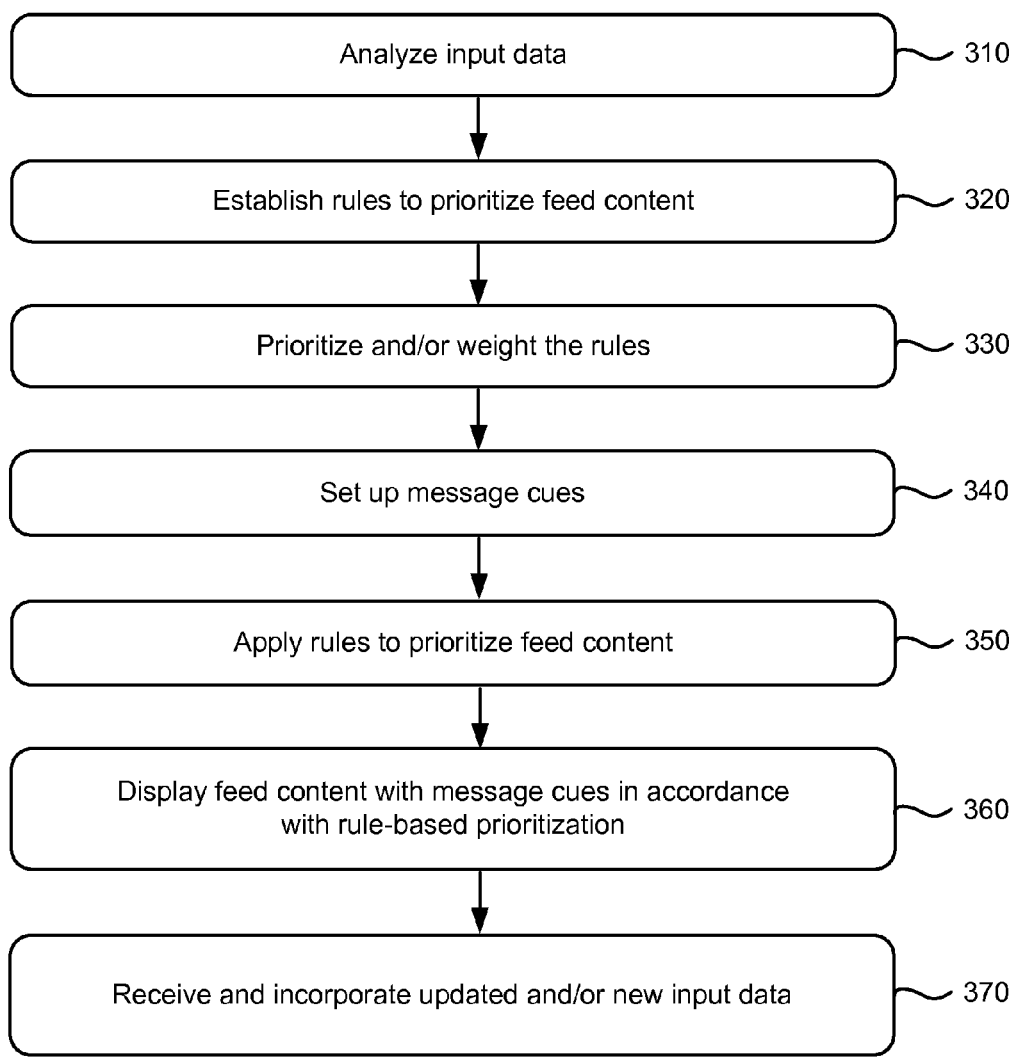
FIG. 3 is a flowchart of a method 300 for proactively prioritizing social data based on persistent rules and for ranking elements in a feed.

FIG. 3 is a flowchart of a method 300 for proactively prioritizing social data based on persistent rules and for ranking elements in a feed. In some embodiments, input data may be submitted to the rules engine, which then analyzes the data and prepares it for use in creating and/or applying rules (310). For example, in some embodiments, feed metrics may be incorporated into the rules; feed metrics are described in further detail in U.S. patent application Ser. No. 13/111,183, claiming priority to U.S. Patent Appln. No. 61/346,839), the content of which is incorporated herein by reference for all purposes. In some embodiments, a rule may create a benchmark with respect to a feed metric, wherein a feed item that meets or exceeds the benchmark is then prioritized. In some embodiments, other input data (user-created data) may be submitted to and analyzed by the rules engine, such as, for example, organization charts, financial/market data, user profiles, entity profiles, Internet content, internal knowledge bases, or customer support databases.

Rules and Rule Criteria

In one embodiment, a user interface is provided to create rule criteria and establish rules (320). In one embodiment, the user interface allows the user to view input data and analysis thereof. In one embodiment, the rules engine may evaluate one or more of the following criteria:

1. Message originator: The user, group, or data source that originated the message (described in further detail below).

2. The subject(s) or keyword(s) within the message content.

3. The target(s) of the message (e.g., an individual, group, or data source).

4. The priority of the message.

5. The message timestamp.

6. Metrics based upon message usage (e.g., number of comments, views, etc.).

7. Additional metrics and information useful for determining the importance/visibility/priority of the social data (e.g., popularity)

8. Content and/or attachment type (images, video, scripts, music . . . ).

These criteria are combinable to form an individual rule. A pseudo code example of criteria usage in a rule might be expressed something like: prioritize data from user "Washington" with "attached content". Criteria may be user-specific or user-independent. User-specific rules may be customized for a particular user who is viewing their feed items. User-independent rules may apply to all users or to designated groups of users (e.g., all users within a particular department, or all users working on a particular project or subject matter area).

In some embodiments, this criteria accounts for popularity/votes. For example, other users (e.g., who are intended recipients) can specify a specific level of popularity or vote for whether a feed elements was useful or not. The number of times that a feed element has been viewed can also be used.

In some embodiments, rules may be prioritized and/or weighted (330). Rules may also be hierarchical so that it is possible to override general rules with specific exceptions.

In some embodiments, rules may be persisted. Rule sets may also be definable, and shareable so that different users can share relevant rules. One example of the use of a shareable rule set is a scenario where an administrator would like to set policy for social data by defining rules on the data.

The rules themselves may be expressed in XML, text, binary, or any other conventional format. In any case, the format must be machine-readable so that the rules engine can process it.

Social Data Cues

In one embodiment, a range of one or more cues are associated with messages so that users can differentiate between various events and status updates associated with the social data. In one embodiment, one or more message cues may be set up and applied by the rules engine (340)—such message cues may configure the visual presentation of the feed or auditory effects presented in association with the feed. Some examples of message cues include the following:

1. Priority placement in the message list. This is extremely important as short-lived messages will quickly disappear into the past, if not placed appropriately.

2. Color or hue

3. Size of display/number of lines displayed

4. Audible tones (note: different tones can be used to indicate different events associated with social data)

5. Flashing/blinking/motion cues, which should be used sparingly but are very effective for drawing attention to data 6. Badges (small icons appearing with the social data) indicating status or criteria.

7. Grouping of social data can be a useful cue for indicating related information.

Adding cues to the pseudo code example from above could result in the following: prioritize data from user "Washington" with "attached content" to "top of display" with color "red".

Once the message cues are set up, the rules engine can commence applying rules to prioritize feed content for user consumption (350) and display feed content with message cues applied in accordance with the rule-based prioritization (360). In one embodiment, the feed elements for feeds that a user has requested can be prioritized into certain levels in the message list for viewing by that user. In embodiments using ranking, each feed element can have unique one level (rank) or multiple feed elements can have the same level (rank). In another embodiment, the feed elements are ranked (or otherwise prioritized) at the source feed (e.g., ranked only against the feed elements for a particular record, person, or entity). This ranking may be against feed elements that may not be viewable for all users. This ranking (priority levels) then can be provided to the intended recipient. For example, each feed element can have a priority level, as determined at the source feed, and the level is supplied with the feed element to the intended recipients. In yet another embodiment, both types of rankings are performed. Thus, the ranking from the source (e.g., ranking between elements for a particular object) may then be used to determine the rankings for feed elements for a particular user. The feed elements can then be displayed in an order by rank, or have highlighting or other markings to denote different rankings.

The prioritization can allow a user to identify more important feed elements, and thus not miss important information. The feed elements can be prioritized based on a variety of factors, which may all be combined, only a couple or more combined, or used independently. In one implementation, a user or admin of a tenant can specify which factors are to be used.

In various embodiments, a feed can have multiple views including rank by popularity or level of importance. Feed elements can be sorted by popularity. A separate feed may be created of items not to miss (e.g., feed elements of a highest priority level).

In one embodiment, a user can tweak weights for each of these categories. In another embodiment, a user can flag a certain rule-based category as "always sticky, float to top, etc. . . . " so that it is always displayed first in the list.

Rules Engine

According to one embodiment, a rules engine is provided that validates the rules, applies them in a consistent fashion, and resolves conflicts, applying the appropriate message cues to the resulting messages so that they can be displayed appropriately. The rules engine will not simply manage new messages, rather it will adjust the entire message backlog based upon incoming messages and changes to existing threads, as some rules may adjust priority or grouping of rules. Some rules may result in the demotion or deletion of social data.

One embodiment of a rules engine may consist of multiple stages. The first stage would execute after rules have been created but before they are applied to social data. It would process and organize the rules so that they can be applied quickly and with the right priority to future data. This stage would consider the rules, the hierarchy, and any adjustments/exceptions relevant to them to create a run time rule set. This stage must be able to resolve apparent conflicts in the input rule set.

The second stage would execute at the time that the social data is available. It would apply the rule set to both the individual messages and the entire thread of social data in close to real time. It would need to be able to compare the rule results of previous messages to determine how new messages should compare to them. It should be able to specify the appropriate cues for each particular message. It must be able to handle changes in the rule set.

In one embodiment, updated or new input data can be incorporated back into the rules engine (370). In some embodiments, with certain types of input data, the input data can be incorporated on the fly, when the rules have been established to account for variable input. For example, as message traffic system-wide increases or decreases, the system may automatically adjust the maximum age of a message that may be designated as "recent" and displayed in a special font or with a special badge. In another example, when a new employee is added to a team, the update to the organizational chart may be submitted to the rules engine to ensure that prioritization rules applying to the team are also applied to the new employee.

Overriding Rules

In one embodiment, a user may indicate that they would either like to preserve or discard the rules processing for a message thread, or manually increase/decrease the "priority." This real-time control grants users the ability to make adjustments based upon their perceived message importance, possibly overriding pre-specified rules. If properly implemented this control effectively allows users to create rules impromptu rather than specifying them all beforehand. Users may also determine which rule was applied and why, so that they can refine their options.

Message Origination

In some embodiments, the rules engine is aware of the organizational personnel structure. Message posted by someone higher up in the chart may receive higher priority. Messages from people in the same team, department, or division as the user or from the same territory as that of the user may have a higher rank. Messages from people who work on the same projects or cases (e.g., Accounts, Leads) as the user may have a higher priority as well. In some embodiments, the user can designate some people as "special" to prioritize feed elements from or related to the "special" person. In some embodiments, prioritization may be designated on a relative basis or on an absolute basis.

In some embodiments, automated messages from Opportunities may be designated as having higher priority than random postings. In some embodiments, automated messages from Contacts or from an Account may be designated as having a higher priority, but perhaps not as high as an active Opportunity.

Some feed items may be automatically generated during operations upon data records or machine events. Such message origination from a data source may also provide another basis for ranking.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that any of the embodiments of the present invention can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of prioritizing feed items based on rules, the method comprising:
  receiving input data, wherein the input data comprises data or feed metrics;
  receiving user input to provide one or more rules to prioritize a feed item, wherein at least one of the one or more rules incorporates the input data, wherein the user input includes one or more message cues, each message cue associated with a respective rule to distinguish the feed item prioritized by the respective rule from other feed items;
  accessing a plurality of feed items associated with a plurality of feeds, wherein at least one of the feeds is associated with an object stored in a database system, and wherein at least one of the feed items represents an event or an information update associated with the object;
  prioritizing, using one or more processors associated with one or more servers, the plurality of feed items based on the one or more rules; and
  for a feed item prioritized based on a rule, automatically displaying the feed item in combination with a message cue associated with the rule.

2. The method of claim 1, wherein a first rule is associated with a first message cue, wherein a second rule is associated with a second message cue, wherein a first feed item is prioritized based on the first rule, wherein a second feed item is prioritized based on the second rule, wherein the first feed item is displayed in combination with the first message cue, and wherein the second feed item is displayed in combination with the second message cue, the first message cue being different from the second message cue.

3. A method of prioritizing feed items based on rules, the method comprising:
  accessing a plurality of feed items associated with a plurality of feeds, wherein at least one of the feeds is associated with an object stored in a database system, and wherein the at least one feed item of the plurality of feed items represents an event or an information update associated with the object;
  receiving input providing one or more rules to prioritize the plurality of feed items, wherein the input includes one or more message cues, each message cue associated with a respective rule to distinguish the feed item prioritized by the respective rule from other feed items;
  prioritizing, using one or more processors associated with one or more servers, the plurality of feed items based on the one or more rules; and
  for at least one feed item prioritized based on a rule, automatically displaying the feed item in combination with a message cue associated with the rule.

4. The method of claim 3, wherein the input is submitted by an administrator, and wherein the one or more rules are user-independent or user-specific.

5. The method claim 3, wherein the input is submitted by a viewer, wherein the viewer is a user of the database system, and wherein the one or more rules are user-specific.

6. The method of claim 3, further comprising:
  weighting the one or more rules, and
  wherein prioritizing the plurality of feeds is based on the one or more weighted rules.

7. The method of claim 3, further comprising:
  receiving input data, wherein the input data comprises user-created data or feed metrics; and
  incorporating the input data into at least one of the one or more rules.

8. The method of claim 7, wherein the user-created data comprises information related to an organization's personnel structure, financial/market data, user profiles, entity profiles, Internet content, a knowledge base, or a customer support database.

9. The method of claim 7, further comprising:
  receiving an update of the input data; and
  updating any rule incorporating the input data.

10. The method of claim 3, wherein displaying a feed in combination with a message cue comprises configuring visual presentation of the feed or auditory effects presented in association with the feed.

11. The method of claim 10, further comprising:
  determining that an originator of a feed item is associated with an object in the database system, wherein the originator is a first user of the database system;
  prioritizing the feed item for viewers who are associated with the same object in the database system, wherein a viewer is a second user of the database system, wherein the first and second users are different; and
  displaying the feed item in combination with at least one message cue to at least one viewer who is associated with the same object in the database system.

12. The method of claim 10, further comprising:

determining that an originator of a feed item is of high rank within an organization, wherein the originator is a first user of the database system, and wherein the organization is associated with an object in the database system;

prioritizing the feed item for employees within the organization, wherein the employees are users of the database system different from the first user, and wherein the employees are of lower rank than the originator within the organization; and displaying the feed item in combination with at least one message cue to at least one employee.

13. The method of claim 10, further comprising:

identifying a first user of the database system;

determining that a second user is designated as special by the first user, wherein the second user is a user of the database system different from the first user; and displaying feed items originated by the second user to the first user, wherein each feed item is displayed to the first user in combination with at least one message cue.

14. The method of claim 10, further comprising:

identifying a first user of the database system;

determining that a feed item has an attachment, wherein the attachment is of a type designated as high priority by the first user;

prioritizing the feed item for the first user;

displaying the feed item to the first user, wherein the feed item is displayed to the first user in combination with at least one message cue.

15. The method of claim 10, further comprising:

identifying a first user of the database system;

determining that a feed item includes a keyword, wherein the keyword is designated by the first user;

prioritizing the feed item for the first user;

displaying the feed item to the first user, wherein the feed item is displayed to the first user in combination with at least one message cue.

16. The method of claim 10, further comprising:

determining that a recent feed item has a recent timestamp;

prioritizing the recent feed item higher than feed items having older timestamps; and displaying the recent feed item in combination with at least one message cue.

17. The method of claim 10, further comprising:

determining that a feed item meets or exceeds a benchmark with respect to a feed metric;

prioritizing the feed item; and displaying the feed item in combination with at least one message cue.

18. A computer program product comprising a non-transitory computer-readable medium storing a plurality of instructions for prioritizing feed items based on rules, the instructions comprising:

program code to access a plurality of feed items associated with a plurality of feeds, wherein at least one of the feeds is associated with an object stored in a database system, and wherein the at least one feed item of the plurality of feed items represents an event or an information update associated with the object;

program code to receive input providing one or more rules to prioritize the plurality of feed items, wherein the input includes one or more message cues, each message cue associated with a respective rule to distinguish the feed item prioritized by the respective rule from other feed items;

program code to prioritize, using one or more processors associated with one or more servers, the plurality of feed items based on the one or more rules; and program code to, for at least one feed item prioritized based on a rule, automatically display the feed item in combination with a message cue associated with the rule.

19. The computer program product of claim 18, wherein the non-transitory computer-readable medium stores further instructions comprising:

program code to receive input data, wherein the input data comprises user-created data or feed metrics; and program code to incorporate the input data into at least one of the one or more rules.

20. A system for prioritizing feed items based on rules, the system comprising a database of feed items, wherein the database is stored on one or more servers; and one or more processors, wherein the one or more processors are configured to perform the following operations:

access a plurality of feed items associated with a plurality of feeds, wherein at least one of the feeds is associated with an object stored in a database system, and wherein the at least one feed item of the plurality of feed items represents an event or an information update associated with the object;

receive, at one or more servers, input providing one or more rules to prioritize the plurality of feed items, wherein the input includes one or more message cues, each message cue associated with a respective rule to distinguish the feed item prioritized by the respective rule from other feed items;

prioritize, using one or more processors associated with the one or more servers, the plurality of feed items based on the one or more rules; and for at least one feed item prioritized based on a rule, automatically display, at one or more display devices, the feed item in combination with a message cue associated with the rule.

* * * * *